United States Patent
More et al.

(10) Patent No.: US 11,599,635 B2
(45) Date of Patent: Mar. 7, 2023

(54) METHODS AND APPARATUS TO IMPROVE DETECTION OF MALWARE BASED ON ECOSYSTEM SPECIFIC DATA

(71) Applicant: McAfee, LLC, San Jose, CA (US)

(72) Inventors: Andres More, Cordoba (AR); Celeste Fralick, Plano, TX (US); Amanda House, Plano, TX (US); Sherin Mathews, Santa Clara, CA (US)

(73) Assignee: McAfee, LLC, San Jose, CA (US)

( * ) Notice: Subject to any disclaimer, the term of this patent is extended or adjusted under 35 U.S.C. 154(b) by 233 days.

(21) Appl. No.: 16/917,497

(22) Filed: Jun. 30, 2020

(65) Prior Publication Data
US 2021/0406613 A1   Dec. 30, 2021

(51) Int. Cl.
*G06F 21/56* (2013.01)
*G06K 9/62* (2022.01)

(52) U.S. Cl.
CPC ............ *G06F 21/56* (2013.01); *G06F 21/567* (2013.01); *G06K 9/6257* (2013.01); *G06K 9/6263* (2013.01)

(58) Field of Classification Search
CPC ..... G06F 21/56; G06F 21/567; G06K 9/6257; G06K 9/6263
See application file for complete search history.

(56) References Cited

U.S. PATENT DOCUMENTS

| 8,719,939 B2 | 5/2014 | Krasser et al. |
| 2012/0084859 A1* | 4/2012 | Radinsky ................ G06F 21/56 |
| | | 707/E17.046 |
| 2019/0166144 A1* | 5/2019 | Mirsky .................. G06N 20/20 |
| 2019/0297096 A1* | 9/2019 | Ahmed ............... H04L 63/1441 |

OTHER PUBLICATIONS

McAfee, "McAfee Threat Intelligence Exchange: Shared threat intelligence across security solutions," Data Sheet, May 2017, 3 pages.
McAfee, "McAfee Endpoint Security 10.7.x Installation Guide," Data Sheet, last updated Apr. 28, 2020, 79 pages.
McAfee, "McAfee Endpoint Security 10.7.x Installation Guide: Sending telemetry data to McAfee," available online: https://docs.mcafee.com/bundle/endpoint-security-10.7.x-installation-guide-windows/page/GUID-11FD1BEC-3040-4909-A2F8-0DE26EBFF94E.html, last retrieved Jun. 8, 2020, 3 pages.
Recorded Future, "What Is Threat Intelligence?," available online: https://www.recordedfuture.com/threat-intelligence/, last retrieved Jun. 8, 2020, 32 pages.

* cited by examiner

*Primary Examiner* — Casey L Kretzer
(74) *Attorney, Agent, or Firm* — Hanley, Flight & Zimmerman, LLC

(57) ABSTRACT

Methods, apparatus, systems, and articles of manufacture are disclosed that improve detection of malware based on ecosystem specific data. An example apparatus includes a feedback weight controller to apply, with a machine learning model, a weight to feedback associated with a sample, the feedback obtained from at least a customer ecosystem and including endpoint feedback, human feedback, infrastructure feedback, and global feedback; and a sample conviction controller to, in response to a score based on the weighted feedback satisfying a threshold for a classification, indicate to a user, with the machine learning model, that the classification for the sample is malicious.

30 Claims, 9 Drawing Sheets

US 11,599,635 B2

METHODS AND APPARATUS TO IMPROVE DETECTION OF MALWARE BASED ON ECOSYSTEM SPECIFIC DATA

FIELD OF THE DISCLOSURE

This disclosure relates generally to malware detection, and, more particularly, to methods and apparatus to improve detection of malware based on ecosystem specific data.

BACKGROUND

Malware (e.g., viruses, worms, trojans, ransomware) is malicious software that is disseminated by attackers to launch a wide range of security attacks, such as stealing users' private information, hijacking devices remotely to deliver massive spam emails, infiltrating a users' online account credentials, etc. The introduction of malware to a computing system may cause serious damages to computer equipment and/or data and/or may cause significant financial loss to Internet users, corporations, and/or computer system owners.

Figure 1:
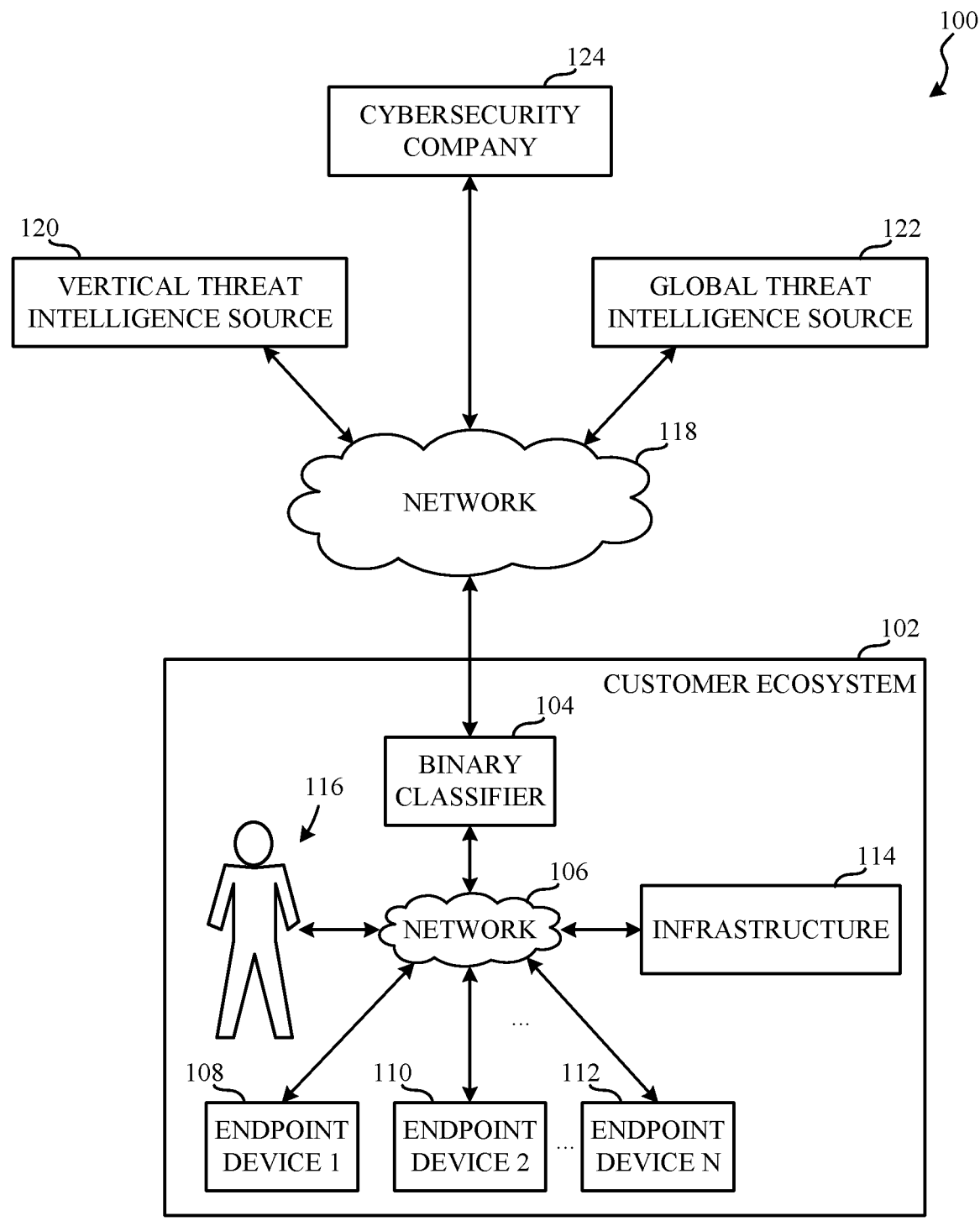
FIG. 1 is an illustration of an example environment including an example customer ecosystem and an example binary classifier.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

To combat malware, Internet users, corporations, and/or computer system owners (e.g., customers) may subscribe to and/or otherwise make payments to a cybersecurity company to access threat protection and detection mechanisms. Threat protection and detection mechanisms are often implemented by classifiers that may be implemented by hardware, software, firmware, and/or any combination thereof.

Threat protection and detection mechanisms evaluate binary files, sometimes referred to as samples, to determine whether the binary files constitute a threat (e.g., whether the binary files are malicious). Binary files include files that store information in a binary format. As such, binary files are computer readable. Binary files include any files that store executable programs as well as most files that store numeric data. Typically, binary files do not include text files.

For threat protection and detection, samples (e.g., binary files) are expected to be classified as either malicious or trusted. However, when a classifier and/or security analyst cannot make a definite classification, the samples may remain unknown or unclassified. Some threat protection and detection mechanisms (e.g., advanced protection and detection technologies) utilize machine learning to aid in classification.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Typically, a customer builds up the environment in which the threat protection and detection mechanism will be deployed (e.g., a detection ecosystem) based on a specific security posture. A security posture refers to a customer's overall cybersecurity strength and how well the customer can predict, prevent, and respond to variable cyberthreats. Additionally, the security posture can be dependent upon the field of a customer. For example, a financial institution's security posture may not allow for executable files to be run in their ecosystem, whereas a software development institution's security posture may allow for such execution. For example, a security posture can include human feedback and third-party integrations to improve a customer's detection capabilities. For example, the McAfee® Threat Intelligence Exchange adds visibility at samples being accessed at a customer's detection ecosystem. The Threat Intelligence Exchange monitors unclassified binaries and customers (e.g., analysts) review the unclassified binaries to either confirm threats or apply trust to reduce the impact on scanning infrastructure.

While machine learning has aided advanced protection and detection mechanisms to better classify samples, these mechanisms only consider sample-specific features after considering global threat intelligence. Global threat intelligence comes from other areas as opposed to the local ecosystems in which the mechanisms are deployed. Thus, the advanced protection and detection mechanisms do not include feedback from the environment in which the threat protection and detection mechanism is deployed (e.g., the local detection ecosystem). Without including the local detection ecosystem feedback (e.g., ecosystem data points), advanced protection and detection mechanism fail to detect advanced persistent threats that are germane to a particular ecosystem.

Advanced persistent threats are typically carried out by stealthy computer network threat actors that gain unauthorized access to a computer ecosystem and remain undetected for an extended period. Advanced persistent threats can also be characterized by large-scale targeted instructions to a computer network to accomplish specific malicious goals. For example, a distributed denial-of-service attack facilitated by a botnet. As used herein, a computer ecosystem refers to an environment in which an entity deploys threat protection and detection mechanism. As used herein, a computer network refers to any network of computing devices.

As opposed to prior threat protection and detection mechanisms, examples disclosed herein leverage the ecosystem data points to guide customers on prioritizing their analysis of unclassified results. Examples disclosed herein include a machine-learning-based classifier that advises (e.g., indicates classifications to) customers during threat analysis of binaries. Examples disclosed herein rely on multi-level ecosystem-wide context features in addition to sample-specific features. Examples disclosed herein periodically retrain machine learning models by augmenting an initial training dataset with updated feedback from the customer-specific security posture. Additionally, examples disclosed herein submit detection telemetry to support further model feature engineering. As used herein, feature engineering and/or model feature engineering refers to processes and/or operations involved in the selection of various features (e.g., objects, arguments, portions of a filed, etc.) from and/or related to samples.

FIG. 1 is an illustration of an example environment 100 including an example customer ecosystem 102 and an example binary classifier 104. The example customer ecosystem 102 includes the example binary classifier 104, an example first network 106, an example first endpoint device 108, an example second endpoint device 110, an example nth endpoint device 112, an example infrastructure 114, an example analyst 116. In the example of FIG. 1, the example binary classifier 104, the example first endpoint device 108, the example second endpoint device 110, the example nth endpoint device 112, the example infrastructure 114, and/or the example analyst 116 are communicatively coupled via the example first network 106.

In the illustrated example of FIG. 1, the example environment 100 includes the example customer ecosystem 102, an example second network 118, an example vertical threat intelligence source 120, an example global threat intelligence source 122, an example cybersecurity company 124. In the example of FIG. 1, the example customer ecosystem 102, the example vertical threat intelligence source 120, the example global threat intelligence source 122, and/or the example cybersecurity company 124 are communicatively coupled via the example second network 118.

In the illustrated example of FIG. 1, the customer ecosystem 102 is an environment in which a customer of the cybersecurity company 124 deploys threat protection and detection mechanism (e.g., the binary classifier 104). For example, the customer ecosystem 102 can include a business's and/or other organization's networks and/or facilities as well as computing devices connected thereto and/or implemented therein. The customer in charge of cybersecurity at the customer ecosystem 102 can subscribe to and/or otherwise make payments to the cybersecurity company 124 to access a trained machine learning model to classify binaries across the customer ecosystem 102. For example, the customer in charge of cybersecurity at the customer ecosystem 102 can access the trained model by downloading the model from the cybersecurity company 124, accessing a web-interface hosted by the cybersecurity company 124 and/or another device, among other techniques. The customer ecosystem 102 should be construed broadly and can include additional elements not illustrated herein and/or discussed herein.

In the illustrated example of FIG. 1, the binary classifier 104 is implemented by a server. In additional or alternative examples, the binary classifier 104 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). In the example of FIG. 1, the binary classifier 104 is a server that implements a machine learning model to determine a classification for binaries from across the customer ecosystem 102 and provide the classification to the analyst 116 to assist in threat analysis.

Many different types of machine learning models and/or machine learning architectures exist. In examples disclosed herein, the binary classifier 104 implements a bootstrap forest model to classify binary files based on endpoint feedback, human feedback, infrastructure feedback, and/or global feedback. Using a bootstrap forest model enables improved classification. In general, machine learning models/architectures that are suitable to use in the example approaches disclosed herein will be decision tree models. However, other types of machine learning models could additionally or alternatively be used such as random forest models, among others.

In examples disclosed herein, endpoint feedback includes file-specific features including static and dynamic features. Static features correspond to those features of a file that are present before execution of the file. For example, static features include file geometry which refers to file size, the number of sections in a file, organizations of those sections, inclusion and characteristics of executable code sections, among others. Dynamic features correspond to those features of a file that are present during execution. For example, dynamic features include behavior profile flags which refer to behaviors of a file that are flagged as suspicious during execution.

Additionally, in examples disclosed herein, endpoint feedback includes a final conviction determined by an endpoint device after the endpoint device applies an internal scanner. The internal scanners can be native to the customer ecosystem 102, provided by the cybersecurity company 124, and/or provided third-party sources. In examples disclosed herein, the internal scanners implement custom policies on exclusions and/or custom exploit/detection rules related to the specific business of the customer (e.g., the customer's vertical market).

In examples disclosed herein, human feedback includes manual convictions (e.g., malicious or benign) of a sample after investigating a human analyst investigates. For example, manual convictions can override previous and/or current classifications for samples. Additionally, human feedback can include a human analyst signing off on a certificate to certify previous and/or current classifications. For example, the analyst can sign a certificate that a classification is correct. Additionally or alternatively, in examples disclosed herein, human feedback can include whitelists and/or blacklists. For example, a whitelist identifies certain features that are permitted for files despite those features raising suspicions of being malicious whereas a blacklist identifies certain features that are not permitted for files regardless of their level of suspicion.

In examples disclosed herein, infrastructure feedback includes age and prevalence of files, aggregated endpoint device reputation, file names and paths of samples, third-party tool integrations providing sample reputations and confidence levels, among others. Third-party tools can include web proxies, next-generation firewalls, sandbox analyzers, vertical threat intelligence feeds, among others. While third-party tools can include vertical threat intelligence, in some examples, the binary classifier 104 can supplements binary classification with vertical feedback that is independent of infrastructure feedback.

In examples disclosed herein, global feedback includes global classifications of well-known and trusted or malicious for samples. Global feedback can include feedback from scanners located around the world (e.g., geographically distributed around the world and/or interfaced with networks that service endpoint devices geographically distributed around the world). In examples disclosed herein, vertical feedback includes feedback from other customers and/or scanners associated with organizations and/or individuals in a vertical market associated with the customer being provided with the vertical feedback. For example, a vertical market is a market in which vendors offer goods and/or services specific to an industry, trade, profession, and/or other group of customers with specialized needs.

In the illustrated example of FIG. 1, the binary classifier 104 obtains feedback from across the customer ecosystem 102 and analyzes samples obtained from endpoint device in the customer ecosystem 102. For example, the binary classifier 104 applies one or more weights to endpoint feedback on a sample, human feedback on the sample, infrastructure feedback on the sample, and/or global feedback on the sample. Optionally, the binary classifier 104 additionally applies one or more weights to vertical feedback on the sample. If the weighted feedback satisfies a threshold to convict the sample, the binary classifier 104 classifies the file as malicious and indicates to the analyst 116 the classification. If the weighted feedback does not satisfy the threshold to convict the sample, the binary classifier 104 classifies the file as benign and indicates to the analyst 116 the classification.

In the illustrated example of FIG. 1, after indicating the classification to the analyst 116, the binary classifier 104 submits telemetry data to the global threat intelligence source 122 and optionally to the vertical threat intelligence source 120. The binary classifier 104 additionally determines whether it is suitable to retrain the machine learning model. When the binary classifier 104 determines that retraining is suitable, the binary classifier 104 submits the model for retraining.

In the illustrated example of FIG. 1, the binary classifier 104 retrains the model locally. In alternative examples, the cybersecurity company 124 retrains the model. In examples disclosed herein, retraining includes obtaining and augmenting an initial training dataset with customer ecosystem specific data. For example, customer ecosystem specific data includes sample features obtained from endpoint devices at the customer ecosystem, analyst classifications made at the customer ecosystem, a customer's specific security posture, and/or telemetry data.

In some examples, the example binary classifier 104 implements example means for classifying binaries. The binary classification means is implemented by executable instructions such as that implemented by at least blocks 402, 404, 406, 408, 410, 412, 414, 416, 418, 420, 422, 424, and 426 of FIG. 4 and/or at least blocks 602, 604, 606, 608, and 610 of FIG. 6. The executable instructions of blocks 402, 404, 406, 408, 410, 412, 414, 416, 418, 420, 422, 424, and 426 of FIG. 4 and/or blocks 602, 604, 606, 608, and 610 of FIG. 6 may be executed on at least one processor such as the example processor 712 of FIG. 7. In other examples, the binary classification means is implemented by hardware logic, hardware implemented state machines, logic circuitry, and/or any other combination of hardware, software, and/or firmware.

In the illustrated example of FIG. 1, the first network 106 is a Local Area Network (LAN). However, the example first network 106 may be implemented using any suitable wired and/or wireless network(s) including, for example, one or more data buses, one or more LANs, one or more wireless LANs, one or more cellular networks, one or more private networks, one or more public networks, the Internet, etc. In additional or alternative examples, the first network 106 is an enterprise network (e.g., within businesses, corporations, etc.), a home network, among others. The example first network 106 enables the binary classifier 104, the first endpoint device 108, the second endpoint device 110, the nth endpoint device 112, the infrastructure 114, and/or the analyst 116 to communicate. As used herein, the phrase "in communication," including variants thereof (e.g., communicate, communicatively coupled, etc.), encompasses direct communication and/or indirect communication through one or more intermediary components and does not require direct physical (e.g., wired) communication and/or constant communication, but rather includes selective communication at periodic or aperiodic intervals, as well as one-time events.

For the sake of clarity, the structure and functionality of the example first endpoint device 108, the example second endpoint device 110, and the example nth endpoint device 112 will be discussed with respect to the first endpoint device 108. However, the structure and functionality of the example first endpoint device 108, the example second endpoint device 110, and the example nth endpoint device 112 is not limited thereto.

In the illustrated example of FIG. 1, the first endpoint device 108 is implemented by a laptop computer. In additional or alternative examples, the first endpoint device 108 can be implemented by a mobile phone, a tablet computer, a desktop computer, a server, among others. In the example of FIG. 1, the first endpoint device 108 can be utilized by a person (e.g., an employee, a homeowner, etc.) to carryout work and/or leisure activities. In the example of FIG. 1, the first endpoint device 108 includes one or more internal scanners that evaluate binaries at the first endpoint device 108. The internal scanners at the first endpoint device 108, and/or, more generally, the first endpoint device 108 provides the binary classifier 104 with endpoint feedback.

In the illustrated example of FIG. 1, the scanners at the first endpoint device 108 may be implemented by hardware, software, firmware, and/or any combination thereof. The scanners at the first endpoint device 108 generate sample-specific features (e.g., static and/or dynamic features for a sample) and/or classify the sample as malicious or benign. The scanners at the first endpoint device 108 then forward the sample-specific features and/or classification of the file to the binary classifier 104.

In the illustrated example of FIG. 1, the infrastructure 114 includes the security tools (e.g., scanning tools) utilized at the customer ecosystem 102. For example, the infrastructure 114 can include security tools developed by the customer associated with the customer ecosystem 102, security tools purchased from the cybersecurity company 124, third-party security tools. For example, the security tools can include web proxies, next-generation firewalls, sandbox analyzers, vertical threat intelligence feeds, among others. In additional or alternative examples, vertical threat intelligence may by implemented independent of the infrastructure (e.g., the vertical threat intelligence source 120) as discussed above. In the example of FIG. 1, the infrastructure 114 provides the binary classifier 104 with infrastructure feedback.

In the illustrated example of FIG. 1, the analyst 116 is implemented as a human that evaluates and/or is in charge of the security of the customer ecosystem 102. For example, the analyst 116 may be an information technology (IT) specialist. In some examples, the analyst 116 may be implemented as an intelligent program and/or machine learning model. In the example of FIG. 1, the analyst 116 provides human feedback to the binary classifier 104. When the analyst 116 is a human analyst, the analyst 116 may interface with the first network 106 via a computing device such as one of the first endpoint device 108, the second endpoint device 110, and/or the nth endpoint device 112.

In the illustrated example of FIG. 1, the example second network 118 is the Internet. However, the example second network 118 may be implemented using any suitable wired and/or wireless network(s) including, for example, one or more data buses, one or more LANs, one or more wireless LANs, one or more cellular networks, one or more private networks, one or more public networks, etc. In additional or alternative examples, the second network 118 is an enterprise network (e.g., within businesses, corporations, etc.), a home network, among others. The example second network 118 enables the customer ecosystem 102 (e.g., the binary classifier 104), the vertical threat intelligence source 120, the global threat intelligence source 122, and/or the cybersecurity company 124 to communicate.

In the illustrated example of FIG. 1, the vertical threat intelligence source 120 is a database of vertical threat intelligence. Vertical threat intelligence includes threat intelligence that is focused on the vertical market of the customer associated with the customer ecosystem 102. Vertical threat intelligence can also include convictions of a sample in the vertical market associated with the customer ecosystem 102, prevalence and age of a sample in the vertical market associated with the customer ecosystem 102, among others. In the example of FIG. 1, the global threat intelligence source 122 is a database of global threat intelligence. Global threat intelligence includes threat intelligence from around the world that is general to any market or customer. Global threat intelligence can also include global convictions of a sample, global prevalence, and age of a sample, among others.

In the illustrated example of FIG. 1, the cybersecurity company 124 is an organization that provides cybersecurity services and products to consumers. For example, the cybersecurity company 124 can provide one or more platforms by which customers can subscribe to and/or otherwise make payments to the cybersecurity company 124 to access cybersecurity services and/or products. For example, the cybersecurity company 124 can provide customers with a trained machine learning model to classify binaries across a customer's ecosystem.

In the illustrated example of FIG. 1, the cybersecurity company 124 can host a platform at which customers can download, access a web-interface, and/or otherwise obtain trained machine learning models. In some examples, the customers at the customer ecosystems may return trained machine learning models to the cybersecurity company 124 for retraining.

In general, implementing a ML/AI system involves two phases, a learning/training phase, and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained and/or retrained using bootstrap aggregating. However, any other training algorithm may additionally or alternatively be used. In examples disclosed herein, training is performed until a target error metric is satisfied. For example, target error metrics includes accuracy, $R^2$, and confusion matrix metrics. In examples disclosed herein, training is performed locally at an endpoint device and/or at a central data processing facility. Training is performed using hyperparameters that control how the learning is performed (e.g., a learning rate, a number of layers to be used in the machine learning model, etc.). In examples disclosed herein, hyperparameters that control the number of nodes in the model and the size of the search space. In some examples retraining may be performed. Such retraining may be performed in response to a time-period being satisfied. In examples disclosed herein, retraining may be performed by the binary classifier 104 and/or the cybersecurity company 124

Training is performed using training data. In examples disclosed herein, the training data originates from internal datasets stored at the cybersecurity company 124. Because supervised training is used, the training data is labeled. Labeling is applied to the training data by a member of a software development company based on previous classifications of the data. In some examples, the training data is pre-processed using, for example, feature vector generation and feature transformations to prepare features for analysis.

Once training is complete, the model is deployed for use as an executable construct that processes an input and provides an output based on the network of nodes and connections defined in the model. The model is stored at binary classifier 104. The model may then be executed by the binary classifier 104.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In some examples, the example cybersecurity company 124 implements example means for providing cybersecurity. The cybersecurity providing means is implemented by executable instructions such as that implemented by at least blocks 502, 504, 506, and 508 of FIG. 5. The executable instructions of blocks 502, 504, 506, and 508 of FIG. 5 may be executed on at least one processor such as the example processor 812 of FIG. 8. In other examples, the cybersecurity providing means is implemented by hardware logic, hardware implemented state machines, logic circuitry, and/or any other combination of hardware, software, and/or firmware.

Figure 2:
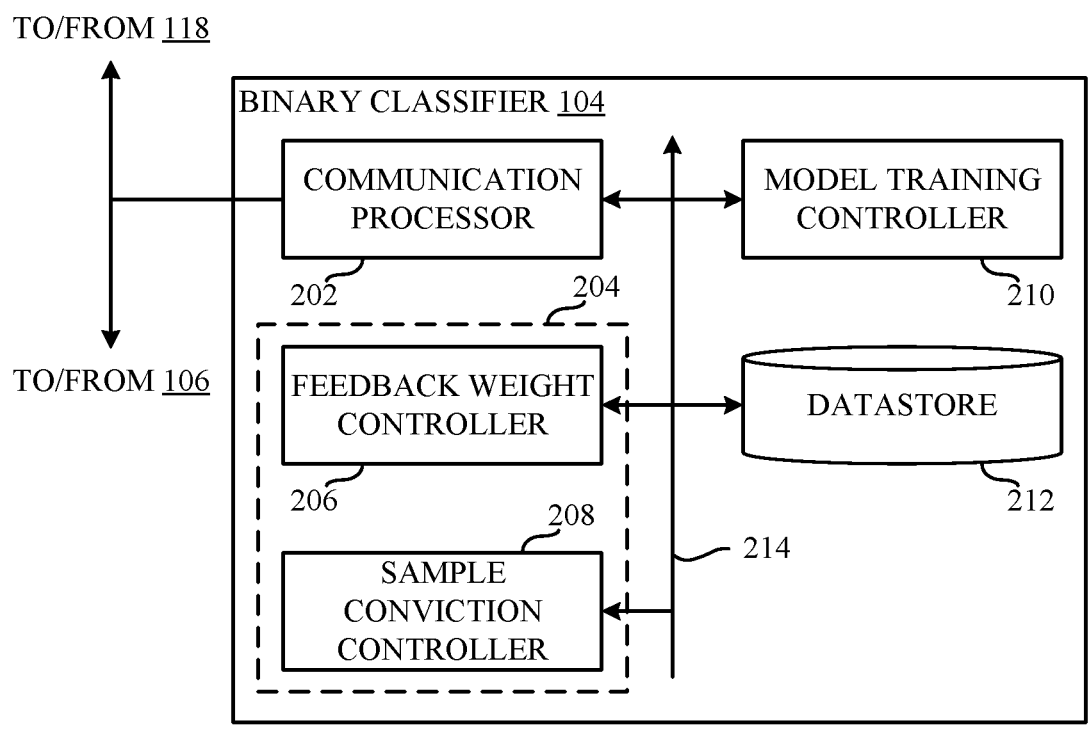
FIG. 2 is a block diagram showing example detail of the example binary classifier of FIG. 1.

FIG. 2 is a block diagram showing example detail of the example binary classifier 104 of FIG. 1. The example binary classifier 104 includes an example communication processor 202, an example model execution controller 204, an example feedback weight controller 206, an example sample conviction controller 208, and example model training controller 210, and an example datastore 212. In the example of FIG. 2, the example model execution controller 204 includes the example feedback weight controller 206 and the example sample conviction controller 208. In the example of FIG. 2, any of the communication processor 202, the model execution controller 204, the feedback weight controller 206, the sample conviction controller 208, the model training controller 210, and/or the datastore 212 can communicate via an example communication bus 214. In examples disclosed herein, the communication bus 214 may be implemented using any suitable wired and/or wireless communication. In additional or alternative examples, the communication bus 214 includes software, machine readable instructions, and/or communication protocols by which information is communicated among the communication processor 202, the model execution controller 204, the feedback weight controller 206, the sample conviction controller 208, the model training controller 210, and/or the datastore 212.

In the illustrated example of FIG. 2, the communication processor 202 is implemented by a network interface controller. In additional or alternative examples, the communication processor 202 can be implemented by one or more analog or digital circuit(s), logic circuits, programmable processor(s), programmable controller(s), GPU(s), DSP(s), ASIC(s), PLD(s) and/or FPLD(s). The example communication processor 202 functions as a network interface configured to communicate with other devices in one or more networks (e.g., the first network 106, the second network 118, etc.) with a designated physical and data link layer standard (e.g., Ethernet or Wi-Fi). For example, the communication processor 202 can obtain one or more samples and corresponding feedback from the customer ecosystem 102 and/or determine whether additional samples are available for classification.

In the example of FIG. 2, the communication processor 202 additionally implements an application programming interface (API) to allow security tools to interface with the binary classifier 104. In this manner, regardless of whether the security tools are native to the customer ecosystem 102, provided by the cybersecurity company 124, and/or provided third-party sources, the security tools can interface with the binary classifier 104 to provide insight as to the threat of a given sample.

In some examples, the example communication processor 202 implements example means for processing communications. The communication processing means is implemented by executable instructions such as that implemented by at least blocks 402 and 426 of FIG. 4. The executable instructions of blocks 402 and 426 of FIG. 4 may be executed on at least one processor such as the example processor 712 of FIG. 7. In other examples, the communication processing means is implemented by hardware logic, hardware implemented state machines, logic circuitry, and/or any other combination of hardware, software, and/or firmware.

In the illustrated example of FIG. 2, the model execution controller 204 is implemented by a controller. In additional or alternative examples, the model execution controller 204 can be implemented by one or more analog or digital circuit(s), logic circuits, programmable processor(s), programmable controller(s), GPU(s), DSP(s), ASIC(s), PLD(s) and/or FPLD(s). The model execution controller 204 includes the feedback weight controller 206 and the sample conviction controller 208. The model execution controller 204 executes machine learning models obtained from the cybersecurity company 124.

In some examples, the example model execution controller 204 implements example means for executing models. The model executing means is implemented by executable instructions such as that implemented by at least blocks 404, 406, 408, 410, 412, 414, 416, 418, and 420 of FIG. 4. The executable instructions of blocks 404, 406, 408, 410, 412, 414, 416, 418, and 420 of FIG. 4 may be executed on at least one processor such as the example processor 712 of FIG. 7. In other examples, the model executing means is implemented by hardware logic, hardware implemented state machines, logic circuitry, and/or any other combination of hardware, software, and/or firmware.

In the illustrated example of FIG. 2, the feedback weight controller 206 is implemented by a controller. In additional or alternative examples, the feedback weight controller 206 can be implemented by one or more analog or digital circuit(s), logic circuits, programmable processor(s), programmable controller(s), GPU(s), DSP(s), ASIC(s), PLD(s) and/or FPLD(s). The feedback weight controller 206 applies one or more weights to feedback associated with one or more samples (e.g., binaries) from the customer ecosystem 102.

In the illustrated example of FIG. 2, the feedback weight controller 206 applies one or more weights to the endpoint feedback, human feedback, infrastructure feedback, and/or global feedback. For example, the feedback weight controller 206 can applies one or more higher weights to the human feedback (e.g., from the analyst 116) as compared to other feedback. Additionally or alternatively, the feedback weight controller 206 can apply one or more weights to the feedback based on the security posture and/or market of the customer associated with the customer ecosystem 102. In additional or alternative examples, the feedback weight controller 206 applies one or more weights to the vertical feedback.

In some examples, the example feedback weight controller 206 implements example means for weighting feedback. The feedback weighting means is implemented by executable instructions such as that implemented by at least blocks 404, 406, 408, 410, and 412 of FIG. 4. The executable instructions of blocks 404, 406, 408, 410, and 412 of FIG. 4 may be executed on at least one processor such as the example processor 712 of FIG. 7. In other examples, the feedback weighting means is implemented by hardware logic, hardware implemented state machines, logic circuitry, and/or any other combination of hardware, software, and/or firmware.

In the illustrated example of FIG. 2, the sample conviction controller 208 is implemented by a controller. In additional or alternative examples, the sample conviction controller 208 can be implemented by one or more analog or digital circuit(s), logic circuits, programmable processor(s), programmable controller(s), GPU(s), DSP(s), ASIC(s), PLD(s) and/or FPLD(s). The sample conviction controller 208 determines a conviction for one or more samples from across the customer ecosystem 102 based on the endpoint feedback, infrastructure feedback, human feedback, vertical feedback, and/or global feedback. After a conviction is determined, the sample conviction controller 208 submits telemetry data to one or more threat intelligence sources. Table 1 illustrates examples of endpoint feedback, infrastructure feedback, global feedback, and/or human feedback for portable executables.

TABLE 1

| | |
|---|---|
| Endpoint Feedback (e.g., sample static features, sample dynamic features, etc.) | Has sample added or removed an installed programs? Has sample registered services? Has sample enabled any program to be automatically run? File size File attributes such as Archive, Read-Only, Hidden, among others File creation time File compilation time Is the sample a packed binary? Is the packer a known packer? Which one? Is the installer a known installer? Which one? Has sample appended data to its geometry? Was sample downloaded from internet? Physical ratios of sample geometry. Virtual ratios on sample geometry. Number of sections in sample geometry. Number of symbol imports. Number of dynamic library imports. Number of exported symbols. Size of initialized data section in sample geometry. File section name checksum. Bytes in entry point. Bytes in appended data. Mask of static geometry heuristics flags including: 1. Number of zero size sections in sample 2. Does sample have no imports/exports? 3. Does the sample contain section names under a whitelist or blacklist? 4. Is last section of the sample executable? 5. Is version information missing? 6. Is sample a DLL? 7. Is the sample a console application? 8. Does the sample use a native subsystem? 9. Is the sample a driver? 10. Does the sample import well known libraries? 11. Does the sample have no resources? 12. Does the sample run inside a container? 13. Does the sample have an embedded signature? 14. Is the sample signature size missing? 15. Does the sample have data out bounds? Mask of API usage including: 1. Does the sample use screen capture APIs? 2. Does the sample use key logging APIs? 3. Does the sample use dynamic loader? 4. Does the sample use remote threat creation? 5. Does the sample use native functions? 6. Does the sample use service controls? 7. Does the sample use drag and drop? 8. Is the sample related to a service provider? 9. Does the sample write to the registry? 10. Does the sample enable debugging? Mask of environment flags including: 1. Is the path to the sample hidden? 2. Is the sample running from removable media (e.g., a jump drive)? From CD ROM? 3. Do duplicate running process name or path exists for the sample? 4. Is the sample stored on system drive? 5. Is the sample in the start menu or a quick launch? Does the sample start at startup? 6. Was the sample spawned from command line? 7. Does the sample include suspicious names or characters? 8. Does the sample include multiple dots in name? 9. Is the sample locked, fresh or old? 10. Is file extension a mismatch with the sample? 11. Was the age of the sample spoofed? 12. Is the sample a browser helper file? Mask of running process flags including: 1. Was the sample spawned from command line? 2. Is parent of the sample dead? 3. Is a window associated with the same invisible and/or shifted out screen? 4. Is the network being used by the sample? 5. Does the sample have a high threat count? 6. Is process associated with the sample hidden? Mask of file location flags including: 1. Is the sample inside browser cache? 2. Is the sample in a root folder? 3. Is sample in a DLL cache? 4. Is sample in Desktop? Program files? User or System temporaries? Start folder? Application data folder? |
| Infrastructure Feedback | Sandbox reputation score Sandbox contacted URL/IP reputation score Sandbox downloaded or dropped file reputation score Web proxy reputation score on the sample |

TABLE 1-continued

| | |
|---|---|
| | Firewall reputation score on the sample |
| | Threat intelligence platform reputation score on the sample |
| | Other tools scores added as external reputation provider |
| | Sample local age |
| | Sample local prevalence |
| | Sample local endpoints reputation (min, max, average) |
| Global | Global sample reputation score |
| Feedback | Global signing certificate reputation score |
| | Global sample prevalence |
| | Global sample age |
| Human | Sample reputation score |
| Feedback | Signing certificate reputation score |

In the illustrated example of FIG. 2, the sample conviction controller 208 determines whether the inputs to the machine learning model (e.g., endpoint feedback, human feedback, infrastructure feedback, global feedback, and/or vertical feedback) corresponding to a sample satisfy a threshold to convict the sample as malicious. For example, the sample conviction controller 208 considers the weighted endpoint feedback, the weighted global feedback, the weighted infrastructure feedback, the weighted human feedback, and/or the weighted vertical feedback. After generating a combined score for the various feedback sources, the sample conviction controller 208 compares the combined score to the threshold to determine whether the threshold is satisfied.

In the illustrated example of FIG. 2, if the sample conviction controller 208 determines that the feedback satisfies the threshold for conviction, the sample conviction controller 208 classifies the sample as malicious and indicates to a human (e.g., the analyst 116) the classification. If the sample conviction controller 208 determines that the feedback does not satisfy the threshold for conviction, the sample conviction controller 208 classifies the sample as benign and indicates to the human (e.g., the analyst 116) the classification.

In the illustrated example of FIG. 2, the sample conviction controller 208 submits telemetry data to one or more threat intelligence sources. Telemetry data can include conflicts between the conviction made by the sample conviction controller 208, the ultimate conviction made by a human (e.g., the analyst 116), an anonymized subset of the same feature datapoints used by the binary classifier 104 to indicate to an analyst (e.g., the analyst 116) the classification of a sample, among others. After a conviction is made (e.g., malicious or benign), a human (e.g., the analyst 116) may note the telemetry data. The sample conviction controller 208 then submits telemetry data to the global threat intelligence source 122 and optionally to the vertical threat intelligence source 120. The determination factor of whether the sample conviction controller 208 submits telemetry data to the vertical threat intelligence source 120 is whether the classification and/or other telemetry data is specific to the vertical market associated with the customer ecosystem 102.

In some examples, the example sample conviction controller 208 implements example means for convicting samples. The sample conviction means is implemented by executable instructions such as that implemented by at least blocks 414, 416, 418, and 420 of FIG. 4. The executable instructions of blocks 414, 416, 418, and 420 of FIG. 4 may be executed on at least one processor such as the example processor 712 of FIG. 7. In other examples, the sample conviction means is implemented by hardware logic, hardware implemented state machines, logic circuitry, and/or any other combination of hardware, software, and/or firmware.

In the illustrated example of FIG. 2, the model training controller 210 is implemented by a controller. In additional or alternative examples, the model training controller 210 can be implemented by one or more analog or digital circuit(s), logic circuits, programmable processor(s), programmable controller(s), GPU(s), DSP(s), ASIC(s), PLD(s) and/or FPLD(s). The model training controller 210 retrains the trained machine learning model deployed to the binary classifier 104 and executed by the model execution controller 204.

In the illustrated example of FIG. 2, the model training controller 210 determines whether to retrain the deployed model. For example, the model training controller 210 can determine whether a threshold time-period has elapsed after which retaining is preferable. Additionally or alternatively, the model training controller 210 can determine whether the feedback provided by a human (e.g., the analyst 116) indicates that that the model is operating such that it no longer satisfies a target error metric.

In the illustrated FIG. 2, in response to determining that retraining is suitable, the model training controller 210 obtains the initial training dataset. For example, the model training controller 210 can obtain, via the communication processor 202, the initial training dataset from the cybersecurity company 124. The model training controller 210 then augments the initial training dataset with customer ecosystem specific data. For example, customer ecosystem specific data includes sample features obtained from endpoint devices at the customer ecosystem, analyst classifications made at the customer ecosystem, a customer's specific security posture, and/or telemetry data.

In the illustrated example of FIG. 2, after augmenting the initial training dataset, the model training controller 210 retrains the model to classify binaries based on the augmented dataset. After the model satisfies a target error metric, the model training controller 210 redeploys the model the model execution controller 204.

In some examples, the example model training controller 210 implements example means for training machine learning models. The machine learning model training means is implemented by executable instructions such as that implemented by at least blocks 422 and 424 of FIG. 4 and/or at least blocks 602, 604, 606, 608, and 610 of FIG. 6. The executable instructions of blocks 422 and 424 of FIG. 4 and/or blocks 602, 604, 606, 608, and 610 of FIG. 6 may be executed on at least one processor such as the example processor 712 of FIG. 7. In other examples, the machine learning model training means is implemented by hardware logic, hardware implemented state machines, logic circuitry, and/or any other combination of hardware, software, and/or firmware.

In the illustrated example of FIG. 2, the datastore 212 is configured to store data. For example, the datastore 212 can store one or more files indicative of endpoint feedback, infrastructure feedback, human feedback, global feedback, vertical feedback, an initial training dataset, an augment training dataset, telemetry data, a trained machine learning model, a retrained machine learning model, samples, among others.

In the illustrated example of FIG. 2, the datastore 212 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example datastore 212 may additionally or alternatively be implemented by one or more double data rate (DDR) memories, such as DDR, DDR2, DDR3, DDR4, mobile DDR (mDDR), etc. The example datastore 212 may additionally or alternatively be implemented by one or more mass storage devices such as hard disk drive(s), compact disk drive(s), digital versatile disk drive(s), solid-state disk drive(s), etc. While in the illustrated example the datastore 212 is illustrated as a single database, the datastore 212 may be implemented by any number and/or type(s) of databases. Furthermore, the data stored in the datastore 212 may be in any data format such as, for example, binary data, comma delimited data, tab delimited data, structured query language (SQL) structures, etc.

Figure 3:
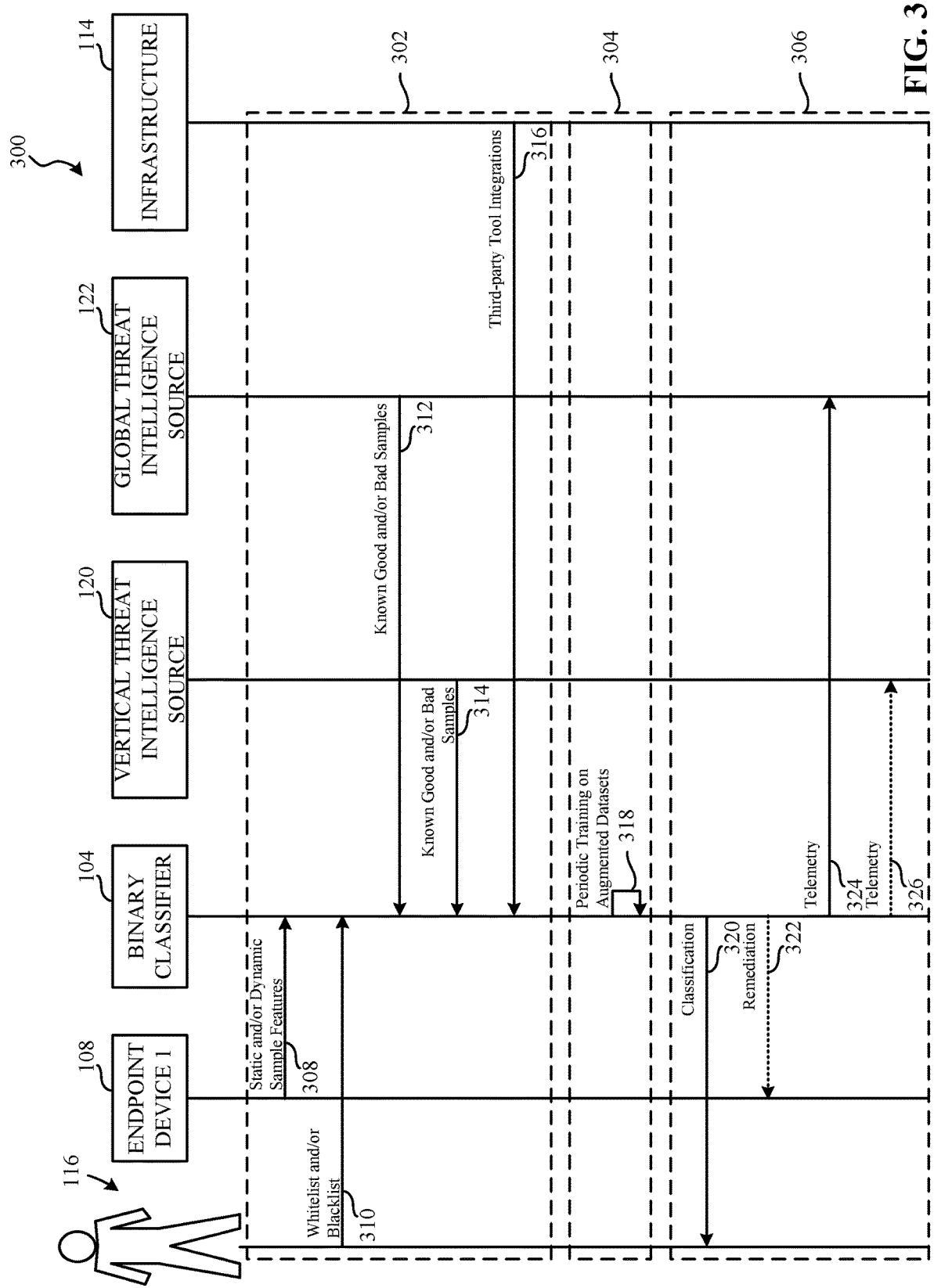
FIG. 3 is a sequence diagram showing an example communication flow between components of the example environment of FIG. 1.

FIG. 3 is a sequence diagram 300 showing an example communication flow between components of the example environment 100 of FIG. 1. The example sequence diagram 300 illustrates example communication between the example binary classifier 104, the example first endpoint device 108, the example infrastructure 114, the example analyst 116, the example vertical threat intelligence source 120, and the example global threat intelligence source 122 via the first network 106 and the second network 118.

In the illustrated example of FIG. 3, the sequence diagram 300 includes an example gathering phase 302, an example retraining phase 304, and an example classification phase 306. In the example of FIG. 3, the sequence diagram 300 begins at the gathering phase 302. The gathering phase 302 is characterized by a consistent collection of feedback from across the customer ecosystem 102. For example, at operation 308, the binary classifier 104 collects and/or is otherwise provided with endpoint feedback from the first endpoint device 108. The endpoint feedback includes, for example, sample-specific static and dynamic features.

In the illustrated example of FIG. 3, at operation 310, the binary classifier 104 collects and/or is otherwise provided with human feedback from the analyst 116. The human feedback includes, for example, whitelists and/or blacklists. The analyst 116 may provide the binary classifier 104 with the human feedback by preemptively establishing the human feedback in a computer memory from which the binary classifier 104 can access the human feedback. Additionally or alternatively, the analyst 116 can provide the binary classifier 104 with the human feedback in substantially real time.

In the illustrated example of FIG. 3, at operation 312, the binary classifier 104 collects and/or is otherwise provided with global feedback from the global threat intelligence source 122. The global feedback includes, for example, known good and/or bad samples from around the world as well as global prevalence and age of unknown but still monitored samples.

In the illustrated example of FIG. 3, at operation 314, the binary classifier 104 collects and/or is otherwise provided with vertical feedback from the vertical threat intelligence source 120. The vertical feedback includes, for example, known good and/or bad samples from the vertical market associated with the customer ecosystem 102. At operation 316, the binary classifier 104 collects and/or is otherwise provided with infrastructure feedback from the infrastructure 114. The infrastructure feedback includes, for example, ecosystem wide features are provided by the overall scanning infrastructure including from integrated third-party tools.

In the illustrated example of FIG. 3, the retraining phase 304 is characterized by periodic retraining of the machine learning model on an augmented dataset that has been augmented with the sample features being recollected at the customer ecosystem 102. For example, at operation 318, the binary classifier 104 retrains the machine learning model locally. In some examples, the binary classifier 104 dis- patches the model the cybersecurity company 124 for retraining. The classification phase 306 is characterized by classification of one or more samples at the customer ecosystem 102. For example, the analyst 116 uses the classification made by the binary classifier 104 to get advice on whether the sample is benign or malicious. In this manner, the analyst 116 can better prioritize investigation resources and confirm.

In the illustrated example of FIG. 3, at operation 320, the binary classifier 104 determines a classification for a sample and forwards the classification to the analyst 116 to assist in threat analysis by the analyst 116. At operation 322, the binary classifier 104 optionally applies remediation actions to the first endpoint device 108. For example, the analyst 116 may configure the binary classifier 104 such that the binary classifier 104 can execute remediation actions at the same or a substantially similar time as providing classifications (e.g., operation 320). For example, the binary classifier 104 can be configured to execute the remediation actions without user input and store an indication of the action taken to remediate any potential vulnerabilities at the datastore 212.

In the illustrated example of FIG. 3, the analyst 116 may choose to roll back the remediation action if the binary classifier 104 improperly classified the sample. In response to a notification from a client to roll back the remediation action, the example binary classifier 104 can roll back and/or otherwise remove the remediation action (e.g., in the event of a false positive). Remediation actions can include quarantining a suspected device, removing security privileges of the suspected device, locking the suspected device, and/or any other suitable remediation action.

In the illustrated example of FIG. 3, after classification and/or remediation, the binary classifier 104 sends back telemetry data to threat intelligence sources and/or stores the telemetry data. In this manner, the telemetry data can be used to fine-tune the model executed by the binary classifier 104 over time as well as to enable future improvements to the model feature engineering. In the example of FIG. 3, at operation 324, the binary classifier 104 transmits telemetry data to the global threat intelligence source 122. Optionally, at operation 326, the binary classifier 104 transmits telemetry data to the vertical threat intelligence source 120. For example, the binary classifier 104 submits telemetry data to the vertical threat intelligence source 120 if the classification of the sample and/or other telemetry data is specific to the vertical market associated with the customer ecosystem 102.

Although the retraining phase 304 is illustrated as occurring between the gathering phase 302 and the classification phase 306, in some examples, the retraining phase may occur after the classification phase 306 and/or after other classification phases. For example, the binary classifier 104 may gather feedback form across the customer ecosystem 102, determine classifications for one or more samples, and then retrain the model.

While an example manner of implementing the binary classifier 104 of FIG. 1 is illustrated in FIG. 2, one or more of the elements, processes and/or devices illustrated in FIG. 2 may be combined, divided, re-arranged, omitted, eliminated and/or implemented in any other way. Further, the example communication processor 202, the example model execution controller 204, the example feedback weight controller 206, the example sample conviction controller 208, the example model training controller 210, the example datastore 212, and/or, more generally, the example binary classifier 104 of FIGS. 1 and/or 2 may be implemented by hardware, software, firmware and/or any combination of hardware, software and/or firmware. Thus, for example, any of the example communication processor 202, the example model execution controller 204, the example feedback weight controller 206, the example sample conviction controller 208, the example model training controller 210, the example datastore 212, and/or, more generally, the example binary classifier 104 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication processor 202, the example model execution controller 204, the example feedback weight controller 206, the example sample conviction controller 208, the example model training controller 210, the example datastore 212, and/or, more generally, the example binary classifier 104 of FIGS. 1 and/or 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example binary classifier 104 of FIGS. 1 and/or 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
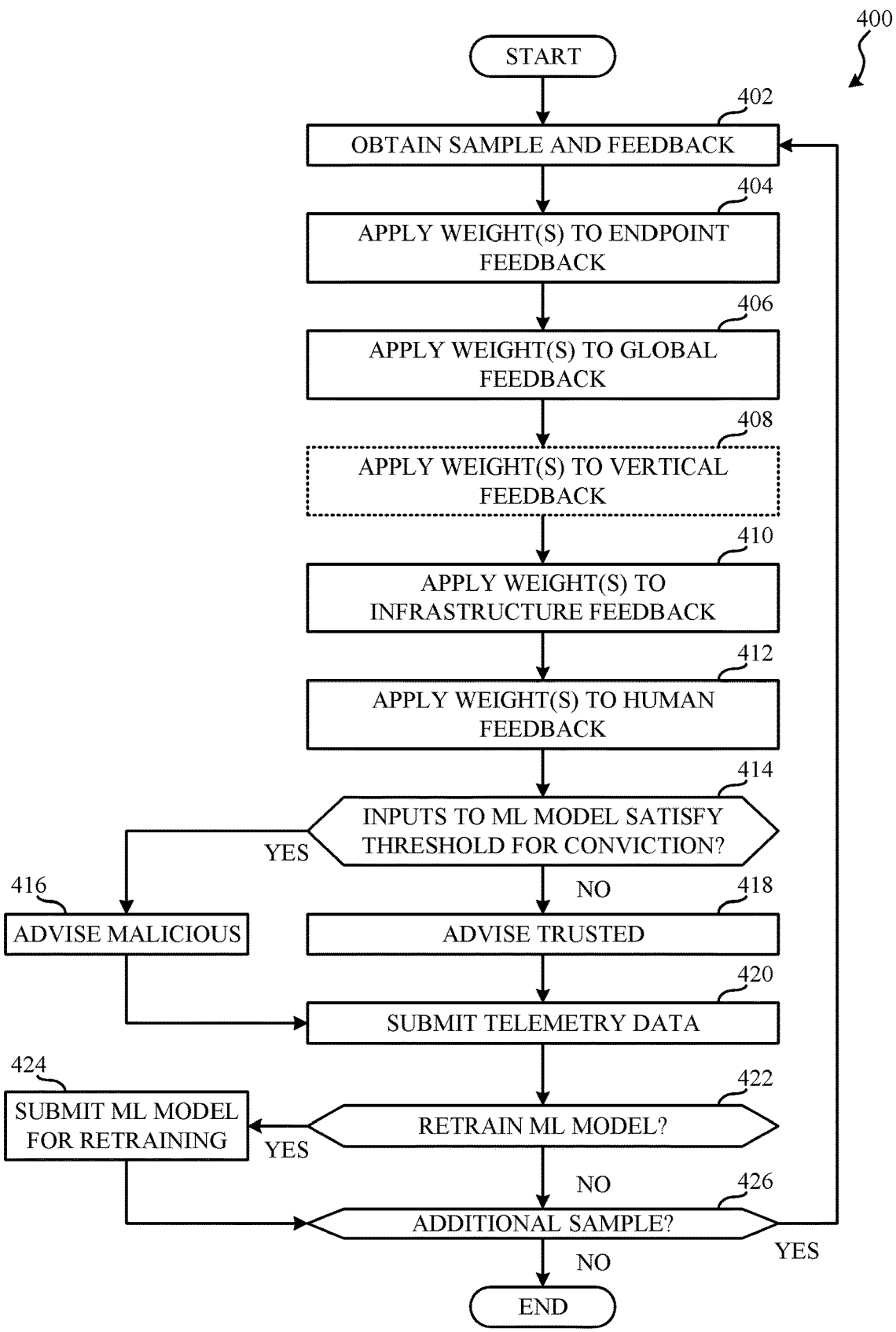
FIG. 4 is a flowchart representative of machine-readable instructions which may be executed to implement the example binary classifier of FIGS. 1 and/or 2 to classify binaries.

Flowcharts representative of example hardware logic, machine readable instructions, hardware implemented state machines, and/or any combination thereof for implementing the binary classifier 104 of FIGS. 1 and/or 2 are shown in FIGS. 4 and/or 6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 4 and/or 6, many other methods of implementing the example binary classifier 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 5:
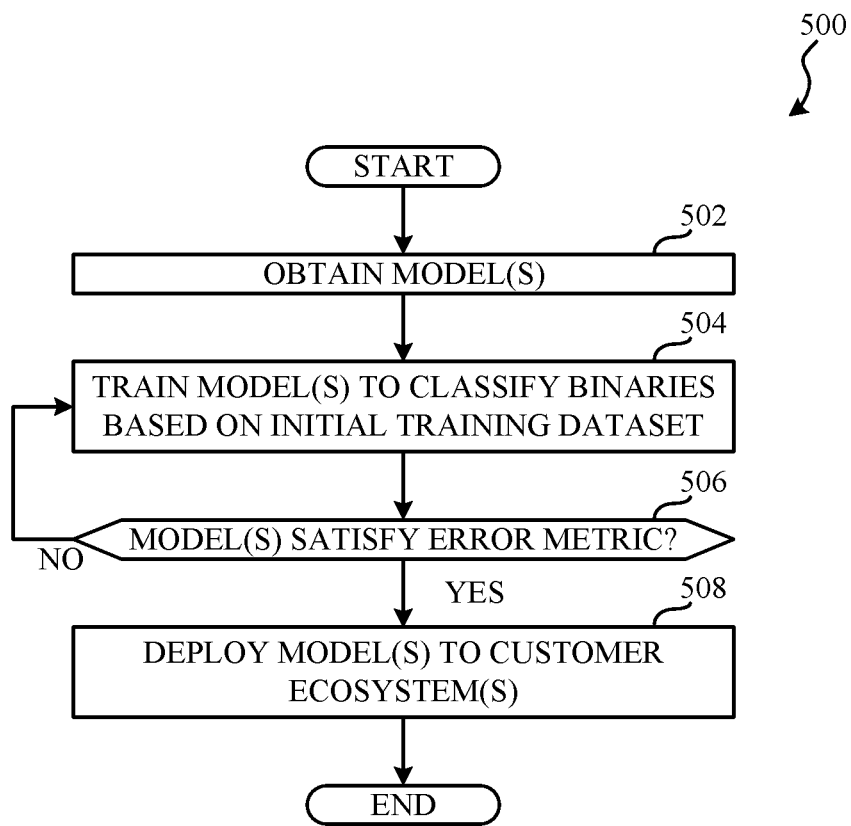
FIG. 5 is a flowchart representative of machine-readable instructions which may be executed to implement the example cybersecurity company of FIG. 1 to train classification models.

Flowcharts representative of example hardware logic, machine readable instructions, hardware implemented state machines, and/or any combination thereof for implementing the cybersecurity company 124 of FIG. 1 are shown in FIGS. 5 and/or 6. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 5 and/or 6, many other methods of implementing the example cybersecurity company 124 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4, 5, and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the terms non-transitory computer readable medium and/or tangible computer-readable medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a," "an," "first," "second," etc.) do not exclude a plurality. The term "a" or "an" entity, as used herein, refers to one or more of that entity. The terms "a" (or "an"), "one or more," and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine-readable instructions 400 which may be executed to implement the example binary classifier 104 of FIGS. 1 and/or 2 to classify binaries. The machine-readable instructions 400 begin at block 402 where binary classifier 104 obtains a sample and the corresponding feedback. For example, at block 402, the communication processor 202 obtains a sample and the corresponding feedback. For example, the corresponding feedback includes endpoint feedback, human feedback, infrastructure feedback, vertical feedback, and/or global feedback associated with a given sample.

In the illustrated example of FIG. 4, at block 404, the binary classifier 104 applies one or more weights to the endpoint feedback. For example, at block 404, the feedback weight controller 206 applies one or more weights to the endpoint feedback. At block 406, the binary classifier 104 applies one or more weights to the global feedback. For example, at block 406, the feedback weight controller 206 applies one or more weights to the global feedback. At block 408, the binary classifier 104 optionally applies one or more weights to the vertical feedback. For example, at block 408, the feedback weight controller 206 applies one or more weights to the vertical feedback.

In the illustrated example of FIG. 4, the feedback weight controller 206, and/or more generally, the binary classifier 104, determines whether to weight the vertical feedback based on whether the vertical feedback is obtained independent of the infrastructure feedback. For example, if the vertical feedback is obtained independent of the infrastructure feedback, the feedback weight controller 206, and/or more generally, the binary classifier 104 applies one or more weights to the vertical feedback.

In the illustrated example of FIG. 2, at block 410, the binary classifier 104 applies one or more weights to the infrastructure feedback. For example, at block 410, the feedback weight controller 206 applies one or more weights to the infrastructure feedback. At block 412, the binary classifier 104 applies one or more weights to the human feedback. For example, at block 412, the feedback weight controller 206 applies one or more weights to the human feedback. At block 414, the binary classifier 104 determines whether the inputs to the machine learning model satisfy a threshold for conviction. For example, at block 414, the sample conviction controller 208 determines whether the inputs to the machine learning model satisfy the threshold for conviction.

In the illustrated example of FIG. 4, if the sample conviction controller 208, and/or, more generally, the binary classifier 104 determines that the inputs (e.g., the weighted feedback) to the machine learning model satisfy a threshold for conviction (block 414: YES), the machine-readable instructions 400 proceed to block 416. If the sample conviction controller 208, and/or, more generally, the binary classifier 104 determines that the inputs (e.g., the weighted feedback) to the machine learning model do not satisfy a threshold for conviction (block 414: NO), the machine-readable instructions 400 proceed to block 418. At block 416, the binary classifier 104 indicates to a user (e.g., the analyst 116) that the sample at issue is malicious. For example, at block 416, the sample conviction controller 208 indicates to the user (e.g., the analyst 116) that the sample at issue is malicious.

In the illustrated example of FIG. 4, at block 418, the binary classifier 104 indicates to a user (e.g., the analyst 116) that the sample at issue is benign. For example, at block 418, the sample conviction controller 208 indicates to the user (e.g., the analyst 116) that the sample at issue is benign. At block 420, the binary classifier 104 submits telemetry data. For example, at block 420, the sample conviction controller 208 submits the telemetry data. Submitting telemetry data includes transmitting the telemetry data to the global threat intelligence source 122, storing the telemetry data in the datastore 212, and/or transmitting the telemetry data to the vertical threat intelligence source 120.

In the illustrated example of FIG. 4, at block 422, the binary classifier 104 determines whether to retrain the machine learning model. For example, at block 422, the model training controller 210 determines whether to retrain the machine learning model. For example, the model training controller 210, and/or, more generally, the binary classifier 104 may determine whether to retrain the machine learning model based on a threshold period of time, whether the machine learning model satisfies a given target error metric, among others.

In the illustrated example of FIG. 4, if the model training controller 210, and/or, more generally, the binary classifier 104 determines to retrain the machine learning model (block 422: YES), the machine-readable instructions 400 proceed to block 424. If the model training controller 210, and/or, more generally, the binary classifier 104 determines not to retrain the machine learning model (block 414: NO), the machine-readable instructions 400 proceed to block 426. At block 424, the binary classifier 104 submits the machine learning model for retraining. For example, at block 424, the model training controller 210 submits the machine learning model for retraining.

In some examples, submitting the machine learning model for retraining refers to retraining the model at the binary classifier 104 with the model training controller 210. In alternative examples, submitting the machine learning model for retraining refers to transmitting the model and ecosystem specific data to the cybersecurity company 124. The determination as to whether to retrain the model at the binary classifier 104 or at the cybersecurity company 124 depends on which venue will be the most computationally inexpensive.

In the illustrated example of FIG. 4, at block 426, the binary classifier 104 determines whether there is an additional sample to be evaluated. For example, at block 426, the communication processor 202 determines whether there are any additional samples that have been received and/or stored in the datastore 212. If the communication processor 202, and/or, more generally, the binary classifier 104 determines that there is an additional sample to be evaluated (block 426: YES), the machine-readable instructions 400 return to block 402. If the communication processor 202, and/or, more generally, the binary classifier 104 determines there is not an additional sample to be evaluated (block 426: NO), the machine-readable instructions 400 terminate.

FIG. 5 is a flowchart representative of machine-readable instructions 500 which may be executed to implement the example cybersecurity company 124 of FIG. 1 to train classification models. The example machine-readable instructions 500 begin at block 502 where the cybersecurity company 124 obtains one or more untrained models. In the illustrated example of FIG. 5, at block 504, the cybersecurity company 124 trains the one or more models to classify binaries based on an initial training dataset.

In the illustrated example of FIG. 5, the initial dataset may be the McAfee® Second Data Contest dataset which includes ENS ATP JCM File Geometry and Behavior Flags. The Second Data Contest dataset is unbalanced by nature as usually malicious activity is not predominant enough to support the training. Thus, prior to training, the cybersecurity company 124 balances classes within the Second Data Contest dataset.

In the illustrated example of FIG. 5, at block 506, the cybersecurity company 124 determines whether the one or more models satisfy a given target error metric. For example, target error metrics includes accuracy, $R^2$, and confusion matrix metrics. In response to the cybersecurity company 124 determining that the model does not satisfy the target error metric (block 506: NO), the machine-readable instructions 500 return to block 504. In response to the cybersecurity company 124 determining that the model satisfies the target error metric (block 506: YES), the machine-readable instructions 500 return to block 508.

In the illustrated example of FIG. 5, at block 508, the cybersecurity company 124 deploys the one or more machine learning models to one or more customer ecosystems. For example, the cybersecurity company 124 deploys the machine learning model to the customer ecosystem 102 for execution at the binary classifier 104. After block 508, the machine-readable instructions 500 terminate.

Figure 6:
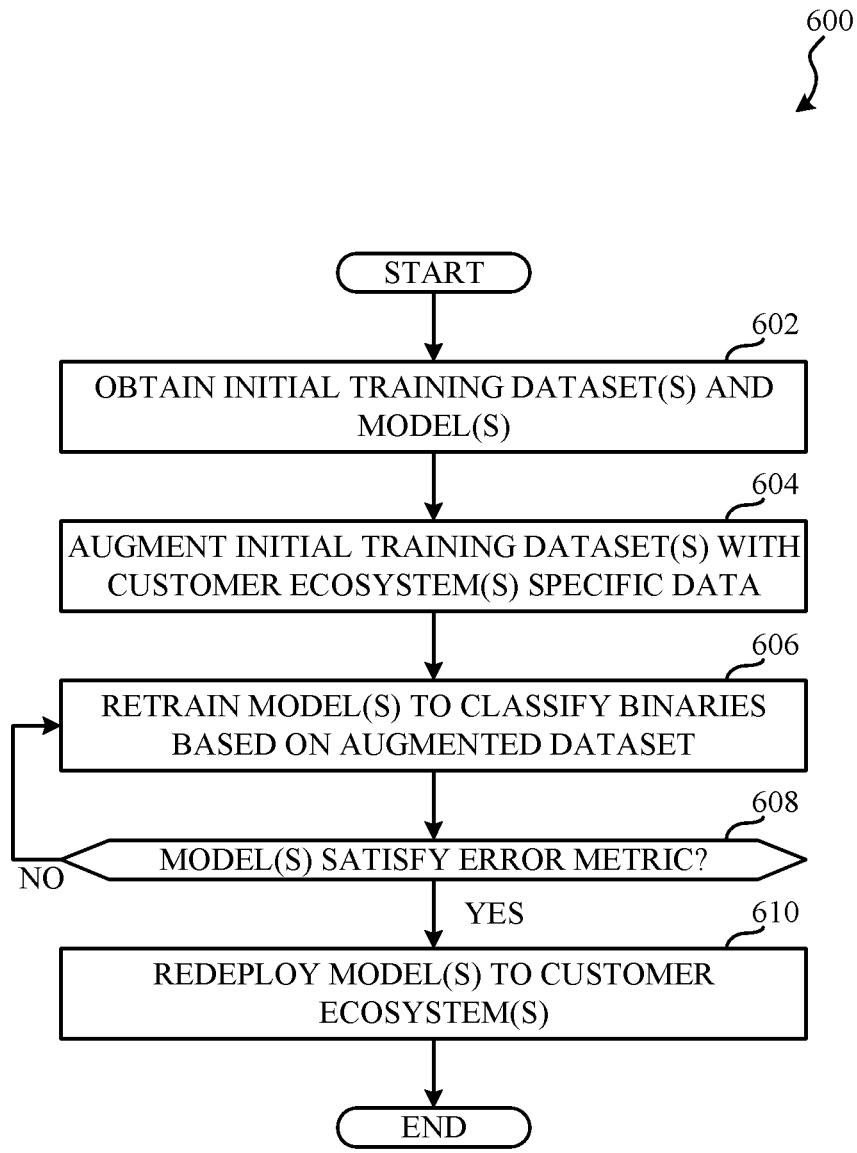
FIG. 6 is a flowchart representative of machine-readable instructions which may be executed to implement the example binary classifier of FIGS. 1 and/or 2 and/or the example cybersecurity company of FIG. 1 to retrain classification models.

FIG. 6 is a flowchart representative of machine-readable instructions 600 which may be executed to implement the example binary classifier 104 of FIGS. 1 and/or 2 and/or the example cybersecurity company 124 of FIG. 1 to retrain classification models. The machine-readable instructions 600 begin at block 602 where the model training controller 210, and/or, more generally, the binary classifier 104 obtains the initial training dataset and model. For example, the model training controller 210 may request the initial training dataset from the cybersecurity company 124 and/or access the initial training dataset from the datastore 212. Alternatively, at block 602, the cybersecurity company 124 obtains the initial training dataset from a database owned, leased, and/or used by the cybersecurity company 124 and the model from a customer ecosystem.

In the illustrated example of FIG. 6, at block 604, the model training controller 210, and/or more generally, the binary classifier 104 augments the initial training dataset with customer ecosystem specific data. For example, customer ecosystem specific data includes sample features obtained from endpoint devices at the customer ecosystem, analyst classifications made at the customer ecosystem, a customer's specific security posture, and/or telemetry data. Alternatively, the cybersecurity company 124 augments the initial training dataset with customer ecosystem specific data. For example, the cybersecurity company 124 can obtain the customer specific ecosystem data from a customer.

In the illustrated example of FIG. 6, at block 606, the model training controller 210, and/or, more generally, the binary classifier 104 retrains the model based on the augmented dataset. Alternatively, at block 606, the cybersecurity company 124 retrains the model based on the augmented dataset. At block 608, the model training controller 210, and/or, more generally, the binary classifier 104 determines whether the model satisfies a given target error metric. Alternatively, at block 608, the cybersecurity company 124 determines whether the model satisfies a given target error metric. For example, target error metrics includes accuracy, $R^2$, and confusion matrix metrics.

In the illustrated example of FIG. 6, in response to the model training controller 210, the binary classifier 104, and/or the cybersecurity company 124 determining that the model does not satisfy the target error metric (block 608: NO), the machine-readable instructions 600 return to block 606. In response to the model training controller 210, the binary classifier 104, and/or the cybersecurity company 124 determining that the model satisfies the target error metric (block 608: YES), the machine-readable instructions 600 return to block 610.

In the illustrated example of FIG. 6, at block 610, the model training controller 210, and/or, more generally, the binary classifier 104 redeploys the retrained machine learning model to the customer ecosystem. For example, the model training controller 210, and/or, more generally, the binary classifier 104 redeploys the retrained model to the model execution controller 204. Alternatively, at block 610, the cybersecurity company 124 redeploys the retrained machine learning model to the customer ecosystem. After block 610, the machine-readable instructions 600 terminate.

Figure 7:
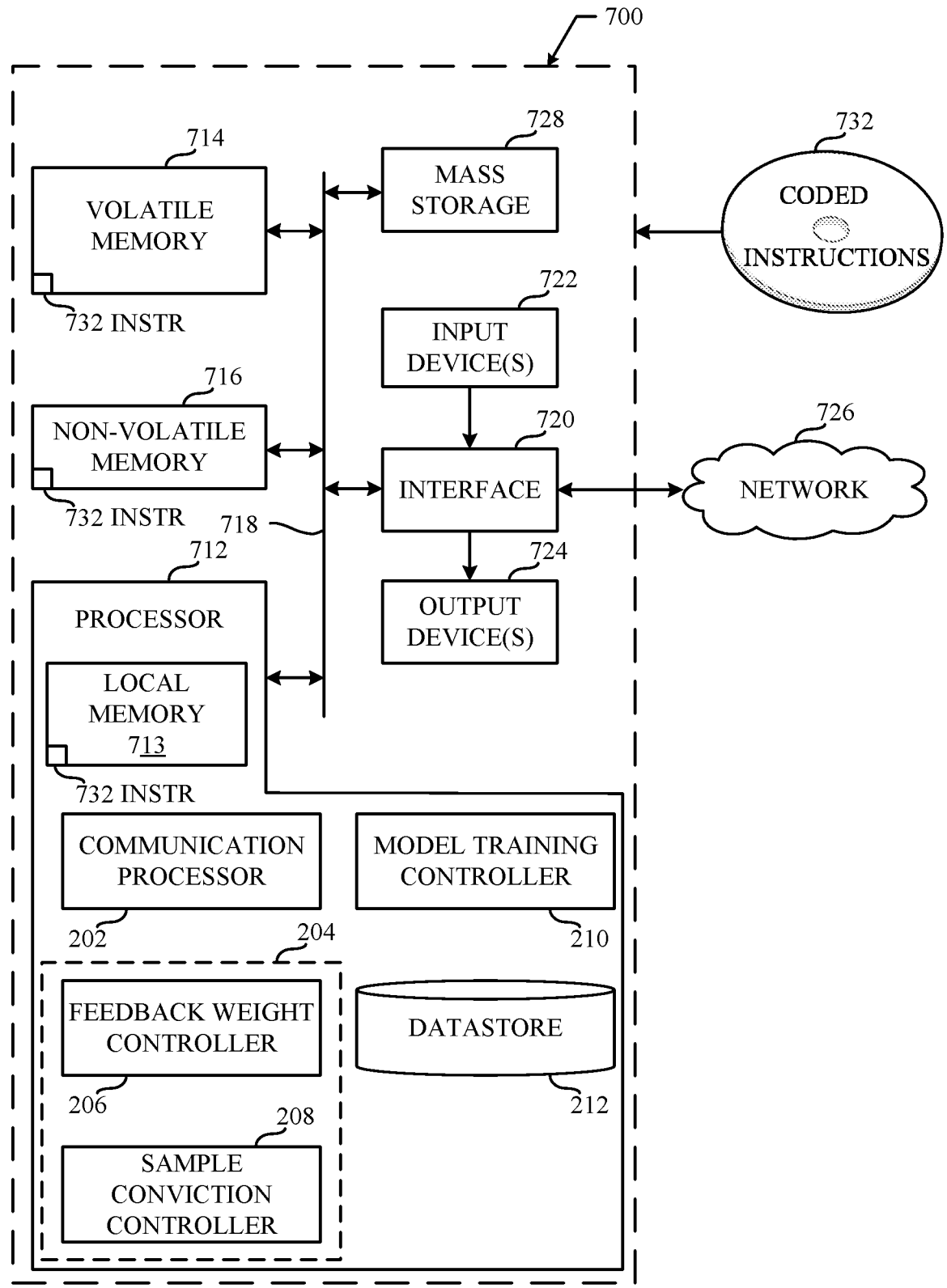
FIG. 7 is a block diagram of an example processing platform structured to execute the instructions of FIGS. 4 and/or 6 to implement the binary classifier of FIGS. 1 and/or 2.

FIG. 7 is a block diagram of an example processing platform structured to execute the instructions of FIGS. 4 and/or 6 to implement the binary classifier of FIGS. 1 and/or 2. The processor platform 700 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor 712 may be a semiconductor based (e.g., silicon based) device. In this example, the processor 712 implements the example communication processor 202, the example model execution controller 204, the example feedback weight controller 206, the example sample conviction controller 208, the example model training controller 210, and the example datastore 212.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random-Access Memory (SDRAM), Dynamic Random-Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip, and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 7 implements the machine-readable instructions 400 and/or the machine-readable instructions 600 and may be stored in the mass storage device 728, in the volatile memory 714, in the non-volatile memory 716, and/or on a removable non-transitory computer readable storage medium such as a CD or DVD.

Figure 8:
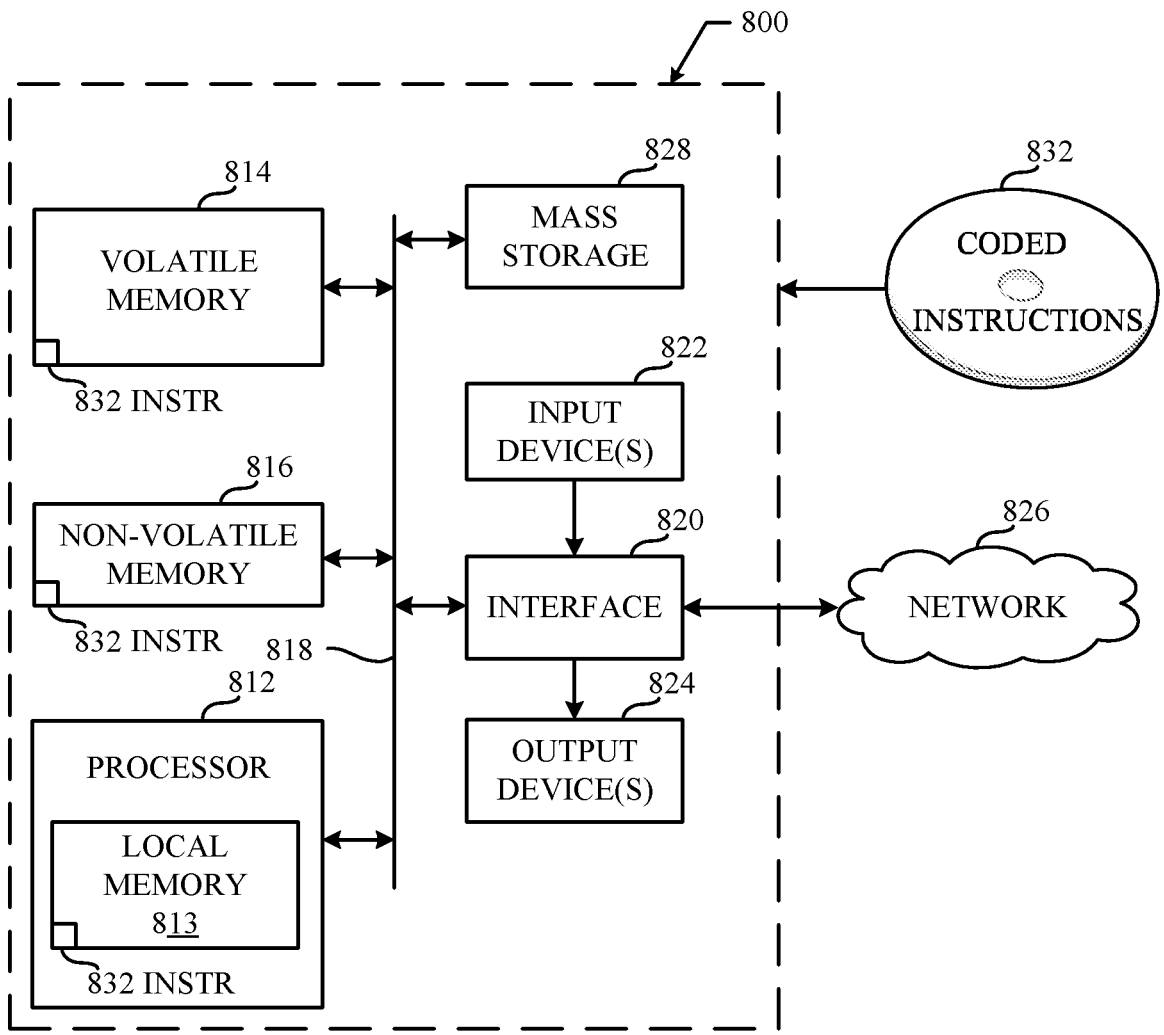
FIG. 8 is a block diagram of an example processing platform structured to execute the instructions of FIGS. 5 and/or 6 to implement the cybersecurity company of FIG. 1.

FIG. 8 is a block diagram of an example processing platform structured to execute the instructions of FIGS. 5 and/or 6 to implement the cybersecurity company 124 of FIG. 1. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor 812 may be a semiconductor based (e.g., silicon based) device.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random-Access Memory (SDRAM), Dynamic Random-Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip, and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 8 implements the machine-readable instructions 500 and/or the machine-readable instructions 600 and may be stored in the mass storage device 828, in the volatile memory 814, in the non-volatile memory 816, and/or on a removable non-transitory computer readable storage medium such as a CD or DVD.

Figure 9:
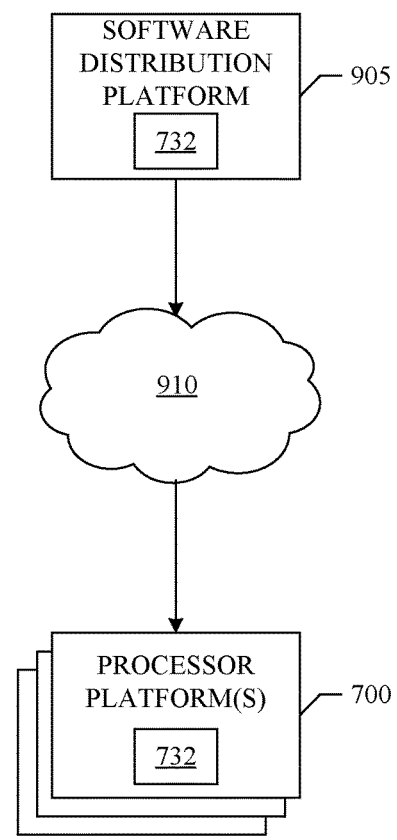
FIG. 9 is a block diagram of an example software distribution platform to distribute software (e.g., software corresponding to the example computer readable instructions of FIGS. 4, 5, and/or 6) to client devices such as those owned by consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 905 to distribute software such as the example machine-readable instructions 732 of FIG. 7 to third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example machine-readable instructions 732 of FIG. 7. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine-readable instructions 732, which may correspond to the example machine-readable instructions 400 of FIG. 4 and/or the machine-readable instructions 600 of FIG. 6, as described above. The one or more servers of the example software distribution platform 905 are in communication with a network 910, which may correspond to any one or more of the Internet and/or any of the example first networks 106 and/or the example second network 118 described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the machine-readable instructions 732 from the software distribution platform 905. For example, the software, which may correspond to the example machine-readable instructions 732 of FIG. 7, may be downloaded to the example processor platform 700, which is to execute the machine-readable instructions 732 to implement the binary classifier 104. In some example, one or more servers of the software distribution platform 905 periodically offer, transmit, and/or force updates to the software (e.g., the example machine-readable instructions 732 of FIG. 7) to ensure improvements, patches, updates, etc. are distributed and applied to the software at the end user devices.

From the foregoing, it will be appreciated that example methods, apparatus, and articles of manufacture have been disclosed that improve detection of malware based on ecosystem specific data. Examples disclosed herein combine data points from different levels of the detection ecosystem. For example, the disclosed methods, apparatus, and articles of manufacture combine data points related to sample-specific static and dynamic features; endpoint conviction after applying custom policy on exclusions and custom exploit/detection rules; human feedback through manual overrides of a sample or signing certificate classification; integrated third-party scanning tools, including web proxies, next-generation firewalls, sandbox analyzers, vertical-specific threat intelligence feeds, etc.; ecosystem-wide aggregations including local intelligence as age and prevalence of samples; and global classification of known good and bad samples. In this manner, examples disclosed herein, provide improved threat detection, and improve a computer by reducing the computational resources consumed by malicious activity.

Additionally, examples disclosed herein periodically retrain machine learning classification models using an augmented dataset that incorporates customer-specific support data. In this manner, examples disclosed herein produce a model that is better fit to the local security posture of customer. Examples disclosed herein also rely on telemetry data to reevaluate model effectiveness. In this manner, examples disclosed herein revisit feature engineering considerations.

As opposed to other techniques that merely utilize sample-specific static and dynamic features, examples disclosed herein improve classification accuracy by relying on customer-specific, human, and third-party tool feedback, as well as unique locally aggregated telemetry data. The period retraining disclosed herein enables classification models that are better fit to a customer-specific security postures which may differ between customers that have different component configuration on their policies. By including telemetry data, examples disclosed herein are future proof and can accommodate changes to the model, such as how features are pre-processed or taken into consideration.

The disclosed methods, apparatus and articles of manufacture improve the efficiency of using a computing device by improving security and reducing excess computational burden caused by malicious activity. The disclosed methods, apparatus and articles of manufacture are accordingly directed to one or more improvement(s) in the functioning of a computer.

Example methods, apparatus, systems, and articles of manufacture to improve detection of malware based on ecosystem specific data are disclosed herein. Further examples and combinations thereof include the following:

Example 1 includes an apparatus comprising a feedback weight controller to apply, with a machine learning model, a weight to feedback associated with a sample, the feedback obtained from at least a customer ecosystem and including endpoint feedback, human feedback, infrastructure feedback, and global feedback, and a sample conviction controller to, in response to a score based on the weighted feedback satisfying a threshold for a classification, indicate to a user, with the machine learning model, that the classification for the sample is malicious.

Example 2 includes the apparatus of example 1, wherein the endpoint feedback includes static and dynamic features specific to the sample and a conviction applied by an endpoint associated with the sample after applying a custom policy on exclusion and custom exploit/detection rules.

Example 3 includes the apparatus of example 2, wherein the human feedback includes manual overriding of the classification and a certificate that the classification is correct.

Example 4 includes the apparatus of example 3, wherein the classification is a first classification and the infrastructure feedback includes a second classification determined by a third-party security tool.

Example 5 includes the apparatus of example 4, wherein the global feedback includes global classifications of the sample.

Example 6 includes the apparatus of example 1, wherein the sample conviction controller is to determine, with the machine learning model, whether the score based on the weighted feedback satisfies the threshold for the classification.

Example 7 includes the apparatus of example 1, further including a model training controller to in response to determining to retrain the machine learning model, augment an initial training dataset for the machine learning model with customer ecosystem specific data, and retrain the machine learning model based on the augmented dataset.

Example 8 includes a tangible computer-readable medium comprising instructions which, when executed, cause at least one processor to at least apply, with a machine learning model, a weight to feedback associated with a sample, the feedback obtained from at least a customer ecosystem and including endpoint feedback, human feedback, infrastructure feedback, and global feedback, and in response to a score based on the weighted feedback satisfying a threshold for a classification, indicate to a user, with the machine learning model, that the classification for the sample is malicious.

Example 9 includes the tangible computer-readable medium of example 8, wherein the endpoint feedback includes static and dynamic features specific to the sample and a conviction applied by an endpoint associated with the sample after applying a custom policy on exclusion and custom exploit/detection rules.

Example 10 includes the tangible computer-readable medium of example 9, wherein the human feedback includes manual overriding of the classification and a certificate that the classification is correct.

Example 11 includes the tangible computer-readable medium of example 10, wherein the classification is a first classification and the infrastructure feedback includes a second classification determined by a third-party security tool.

Example 12 includes the tangible computer-readable medium of example 11, wherein the global feedback includes global classifications of the sample.

Example 13 includes the tangible computer-readable medium of example 8, wherein the instructions, when executed, cause the at least one processor to determine, with the machine learning model, whether the score based on the weighted feedback satisfies the threshold for the classification.

Example 14 includes the tangible computer-readable medium of example 8, wherein the instructions, when executed, cause the at least one processor to in response to determining to retrain the machine learning model, augment an initial training dataset for the machine learning model with customer ecosystem specific data, and retrain the machine learning model based on the augmented dataset.

Example 15 includes an apparatus comprising means for weighting feedback to apply, with a machine learning model, a weight to feedback associated with a sample, the feedback obtained from at least a customer ecosystem and including endpoint feedback, human feedback, infrastructure feedback, and global feedback, and means for convicting samples to, in response to a score based on the weighted feedback satisfying a threshold for a classification, indicate to a user, with the machine learning model, that the classification for the sample is malicious.

Example 16 includes the apparatus of example 15, wherein the endpoint feedback includes static and dynamic features specific to the sample and a conviction applied by an endpoint associated with the sample after applying a custom policy on exclusion and custom exploit/detection rules.

Example 17 includes the apparatus of example 16, wherein the human feedback includes manual overriding of the classification and a certificate that the classification is correct.

Example 18 includes the apparatus of example 17, wherein the classification is a first classification and the infrastructure feedback includes a second classification determined by a third-party security tool.

Example 19 includes the apparatus of example 18, wherein the global feedback includes global classifications of the sample.

Example 20 includes the apparatus of example 15, wherein the means for convicting samples is to determine, with the machine learning model, whether the score based on the weighted feedback satisfies the threshold for the classification.

Example 21 includes the apparatus of example 15, further including means for training machine learning models to in response to determining to retrain the machine learning model, augment an initial training dataset for the machine learning model with customer ecosystem specific data, and retrain the machine learning model based on the augmented dataset.

Example 22 includes a server to distribute first instructions on a network, the server comprising at least one storage device including second instructions, and at least one processor to execute the second instructions to transmit the first instructions over the network, the first instructions, when executed, to cause at least one device to apply, with a machine learning model, a weight to feedback associated with a sample, the feedback obtained from at least a customer ecosystem and including endpoint feedback, human feedback, infrastructure feedback, and global feedback, and in response to a score based on the weighted feedback satisfying a threshold for a classification, indicate to a user, with the machine learning model, that the classification for the sample is malicious.

Example 23 includes the server of example 22, wherein the endpoint feedback includes static and dynamic features specific to the sample and a conviction applied by an endpoint associated with the sample after applying a custom policy on exclusion and custom exploit/detection rules.

Example 24 includes the server of example 23, wherein the human feedback includes manual overriding of the classification and a certificate that the classification is correct.

Example 25 includes the server of example 24, wherein the classification is a first classification and the infrastructure feedback includes a second classification determined by a third-party security tool.

Example 26 includes the server of example 25, wherein the global feedback includes global classifications of the sample.

Example 27 includes the server of example 22, wherein the first instructions, when executed, cause the at least one processor to determine, with the machine learning model, whether the score based on the weighted feedback satisfies the threshold for the classification.

Example 28 includes the server of example 22, wherein the first instructions, when executed, cause the at least one processor to in response to determining to retrain the machine learning model, augment an initial training dataset for the machine learning model with customer ecosystem specific data, and retrain the machine learning model based on the augmented dataset.

Example 29 includes a method comprising applying, with a machine learning model, a weight to feedback associated with a sample, the feedback obtained from at least a customer ecosystem and including endpoint feedback, human feedback, infrastructure feedback, and global feedback, and in response to a score based on the weighted feedback satisfying a threshold for a classification, indicating to a user, with the machine learning model, that the classification for the sample is malicious.

Example 30 includes the method of example 29, wherein the endpoint feedback includes static and dynamic features specific to the sample and a conviction applied by an endpoint associated with the sample after applying a custom policy on exclusion and custom exploit/detection rules.

Example 31 includes the method of example 30, wherein the human feedback includes manual overriding of the classification and a certificate that the classification is correct.

Example 32 includes the method of example 31, wherein the classification is a first classification and the infrastructure feedback includes a second classification determined by a third-party security tool.

Example 33 includes the method of example 32, wherein the global feedback includes global classifications of the sample.

Example 34 includes the method of example 29, further including determining, with the machine learning model, whether the score based on the weighted feedback satisfies the threshold for the classification.

Example 35 includes the method of example 29, further including in response to determining to retrain the machine learning model, augmenting an initial training dataset for the machine learning model with customer ecosystem specific data, and retraining the machine learning model based on the augmented dataset.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    a feedback weight controller to apply, with a machine learning model, a weight to feedback associated with a sample, the feedback obtained from at least a customer ecosystem, the feedback including endpoint feedback, human feedback, infrastructure feedback, and global feedback, the endpoint feedback including static and dynamic features specific to the sample and a conviction applied by an endpoint associated with the sample after applying a custom policy on exclusion and custom exploit/detection rules; and
    a sample conviction controller to, in response to a score based on the weighted feedback satisfying a threshold for a classification, indicate to a user, with the machine learning model, that the classification for the sample is malicious.

2. The apparatus of claim 1, wherein the human feedback includes manual overriding of the classification and a certificate that the classification is correct.

3. The apparatus of claim 2, wherein the classification is a first classification and the infrastructure feedback includes a second classification determined by a third-party security tool.

4. The apparatus of claim 3, wherein the global feedback includes global classifications of the sample.

5. The apparatus of claim 1, wherein the sample conviction controller is to determine, with the machine learning model, whether the score based on the weighted feedback satisfies the threshold for the classification.

6. The apparatus of claim 1, further including a model training controller to:
in response to determining to retrain the machine learning model, augment an initial training dataset for the machine learning model with customer ecosystem specific data; and
retrain the machine learning model based on the augmented dataset.

7. A tangible computer-readable medium comprising instructions which, when executed, cause at least one processor to at least:
apply, with a machine learning model, a weight to feedback associated with a sample, the feedback obtained from at least a customer ecosystem, the feedback including endpoint feedback, human feedback, infrastructure feedback, and global feedback, the endpoint feedback including static and dynamic features specific to the sample and a conviction applied by an endpoint associated with the sample after applying a custom policy on exclusion and custom exploit/detection rules; and
in response to a score based on the weighted feedback satisfying a threshold for a classification, indicate to a user, with the machine learning model, that the classification for the sample is malicious.

8. The tangible computer-readable medium of claim 7, wherein the human feedback includes manual overriding of the classification and a certificate that the classification is correct.

9. The tangible computer-readable medium of claim 8, wherein the classification is a first classification and the infrastructure feedback includes a second classification determined by a third-party security tool.

10. The tangible computer-readable medium of claim 9, wherein the global feedback includes global classifications of the sample.

11. The tangible computer-readable medium of claim 7, wherein the instructions, when executed, cause the at least one processor to determine, with the machine learning model, whether the score based on the weighted feedback satisfies the threshold for the classification.

12. The tangible computer-readable medium of claim 7, wherein the instructions, when executed, cause the at least one processor to:
in response to determining to retrain the machine learning model, augment an initial training dataset for the machine learning model with customer ecosystem specific data; and
retrain the machine learning model based on the augmented dataset.

13. An apparatus comprising:
means for weighting feedback to apply, with a machine learning model, a weight to feedback associated with a sample, the feedback obtained from at least a customer ecosystem, the feedback including endpoint feedback, human feedback, infrastructure feedback, and global feedback, the endpoint feedback including static and dynamic features specific to the sample and a conviction applied by an endpoint associated with the sample after applying a custom policy on exclusion and custom exploit/detection rules; and
means for convicting samples to, in response to a score based on the weighted feedback satisfying a threshold for a classification, indicate to a user, with the machine learning model, that the classification for the sample is malicious.

14. The apparatus of claim 13, wherein the human feedback includes manual overriding of the classification and a certificate that the classification is correct.

15. The apparatus of claim 14, wherein the classification is a first classification and the infrastructure feedback includes a second classification determined by a third-party security tool.

16. The apparatus of claim 15, wherein the global feedback includes global classifications of the sample.

17. The apparatus of claim 13, further including means for training machine learning models to:
in response to determining to retrain the machine learning model, augment an initial training dataset for the machine learning model with customer ecosystem specific data; and
retrain the machine learning model based on the augmented dataset.

18. The apparatus of claim 13, wherein the means for convicting samples is to determine, with the machine learning model, whether the score based on the weighted feedback satisfies the threshold for the classification.

19. A server to distribute first instructions on a network, the server comprising:
at least one storage device including second instructions; and
at least one processor to execute the second instructions to transmit the first instructions over the network, the first instructions, when executed, to cause at least one device to:
apply, with a machine learning model, a weight to feedback associated with a sample, the feedback obtained from at least a customer ecosystem, the feedback including endpoint feedback, human feedback, infrastructure feedback, and global feedback, the endpoint feedback including static and dynamic features specific to the sample and a conviction applied by an endpoint associated with the sample after applying a custom policy on exclusion and custom exploit/detection rules; and
in response to a score based on the weighted feedback satisfying a threshold for a classification, indicate to a user, with the machine learning model, that the classification for the sample is malicious.

20. The server of claim 19, wherein the human feedback includes manual overriding of the classification and a certificate that the classification is correct.

21. The server of claim 20, wherein the classification is a first classification and the infrastructure feedback includes a second classification determined by a third-party security tool.

22. The server of claim 21, wherein the global feedback includes global classifications of the sample.

23. The server of claim 19, wherein the first instructions, when executed, cause the at least one processor to determine, with the machine learning model, whether the score based on the weighted feedback satisfies the threshold for the classification.

24. The server of claim 19, wherein the first instructions, when executed, cause the at least one processor to:
in response to determining to retrain the machine learning model, augment an initial training dataset for the machine learning model with customer ecosystem specific data; and
retrain the machine learning model based on the augmented dataset.

25. A method comprising:
applying, with a machine learning model, a weight to feedback associated with a sample, the feedback obtained from at least a customer ecosystem, the feedback including endpoint feedback, human feedback, infrastructure feedback, and global feedback, the endpoint feedback including static and dynamic features specific to the sample and a conviction applied by an endpoint associated with the sample after applying a custom policy on exclusion and custom exploit/detection rules; and
in response to a score based on the weighted feedback satisfying a threshold for a classification, indicating to a user, with the machine learning model, that the classification for the sample is malicious.

26. The method of claim 25, wherein the human feedback includes manual overriding of the classification and a certificate that the classification is correct.

27. The method of claim 26, wherein the classification is a first classification and the infrastructure feedback includes a second classification determined by a third-party security tool.

28. The method of claim 27, wherein the global feedback includes global classifications of the sample.

29. The method of claim 25, further including determining, with the machine learning model, whether the score based on the weighted feedback satisfies the threshold for the classification.

30. The method of claim 25, further including:
in response to determining to retrain the machine learning model, augmenting an initial training dataset for the machine learning model with customer ecosystem specific data; and
retraining the machine learning model based on the augmented dataset.

* * * * *